(12) United States Patent
Leicht et al.

(10) Patent No.: US 9,591,625 B2
(45) Date of Patent: Mar. 7, 2017

(54) TECHNIQUE FOR UPLINK DATA PROCESSING

(75) Inventors: Hans Juergen Leicht, Unterleinleiter (DE); Joerg Armbruster, Bubenreuth (DE); Gerhard Hierl, Nuremberg (DE); Christian Hofmann, Nuremberg (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 27 days.

(21) Appl. No.: 14/413,865

(22) PCT Filed: Jul. 11, 2012

(86) PCT No.: PCT/EP2012/002924
§ 371 (c)(1),
(2), (4) Date: Jan. 9, 2015

(87) PCT Pub. No.: WO2014/008905
PCT Pub. Date: Jan. 16, 2014

(65) Prior Publication Data
US 2015/0173062 A1  Jun. 18, 2015

(51) Int. Cl.
*H04W 72/04* (2009.01)
*H04W 28/06* (2009.01)
(Continued)

(52) U.S. Cl.
CPC ... *H04W 72/0413* (2013.01); *H04W 28/0278* (2013.01); *H04W 28/06* (2013.01);
(Continued)

(58) Field of Classification Search
None
See application file for complete search history.

(56) References Cited

U.S. PATENT DOCUMENTS

| | | | |
|---|---|---|---|
| 2009/0113086 A1* | 4/2009 | Wu | H04W 72/1284 710/56 |
| 2010/0077100 A1* | 3/2010 | Hsu | H04W 72/1221 709/234 |

(Continued)

OTHER PUBLICATIONS

Samsung, "The complexity of BSR cancellation", 3GPP TSG-RAN2 Meeting #62bis, Warsaw, PL, Jun. 30, 2008, pp. 1-6, Tdoc R2-083504, 3GPP.

(Continued)

*Primary Examiner* — Duc Duong
(74) *Attorney, Agent, or Firm* — Coats & Bennett, PLLC

(57) ABSTRACT

A technique for allocating a uplink data volume 504 to uplink data pending for transmission in a telecommunications device is provided. As to a method aspect of the technique, a grant of the uplink data volume is received. A portion 502 of the granted uplink data volume is reserved for transmission of a buffer status report, which is to be provided by a Data Link layer 300 of the telecommunications device. A size of the buffer status report depends on a number of channels for which uplink data is pending. If an unreserved portion 503 of the granted uplink data volume is not sufficiently sized for the pending uplink data, the unreserved portion and at least a part of the reserved portion are allocated to at least a portion of the pending uplink data when the allocation corresponds to a reduction of a number of channels for which uplink data is pending so that the buffer status report is at least reduced in size.

18 Claims, 8 Drawing Sheets

(51) Int. Cl.
*H04W 28/02* (2009.01)
*H04W 72/12* (2009.01)

(52) U.S. Cl.
CPC ... *H04W 72/0446* (2013.01); *H04W 72/1284* (2013.01); *H04W 72/1268* (2013.01)

(56) References Cited

U.S. PATENT DOCUMENTS

| | | | |
|---|---|---|---|
| 2012/0039263 A1* | 2/2012 | Moberg | H04W 72/1284 370/329 |
| 2012/0069805 A1* | 3/2012 | Feuersanger | H04W 72/1284 370/329 |
| 2013/0028223 A1* | 1/2013 | Kim | H04L 5/0007 370/329 |
| 2013/0083677 A1* | 4/2013 | Kim | H04W 72/1284 370/252 |

OTHER PUBLICATIONS

ZTE, "BSR reporting scheme", 3GPP TSG RAN WG2#70, Montreal, CA, May 10, 2010, pp. 1-4, R2-102816, 3GPP.

Samsung, "On BSR type selection", 3GPP TSG-RAN 2#72bis meeting, Dublin, IE, Jan. 17, 2011, pp. 1-2, Tdoc R2-110073, 3GPP.

Huawei, et al., "BSR Type Selection", 3GPP TSG-RAN WG2 Meeting #72bis, Dublin, IE, Jan. 17, 2011, pp. 1-2, R2-110370, 3GPP.

Third Generation Partnership Project, "3rd Generation Partnership Project; Technical Specification Gropu Radio Access Network; Evolved Universal Terrestrial Radio Access (E-UTRA); Medium Access Control (MAC) protocol specification (Release 10)", Technical Specification, 3GPP TS 36.321 V10.5.0, Mar. 1, 2012; pp. 1-54, 3GPP, France.

New Postcom, "Discussions on BSR format selection", 3GPP TSG-RAN WG2 Meeting #72bis, Dublin, IE, Jan. 17, 2011, pp. 1-4, R2-110049, 3GPP.

Third Generation Partnership Project, "3rd Generation Partnership Project; Technical Specification Group Radio Access Network; Evolved Universal Terrestrial Radio Access (E-UTRA) Medium Access Control (MAC) protocol specification (Release 8)", Technical Specification, 3GPP TS 36.321 V8.1.0, Mar. 1, 2008, pp. 1-30, 3GPP, France.

Third Generation Partnership Project, "3rd Generation Partnership Project; Technical Specification Group Radio Access Network; Evolved Universal Terrestrial Radio Access (E-UTRA); Radio Link Control (RLC) protocol specification (Release 9)", Technical Specification, 3GPP TS 36.322 V9.2.0, Jun. 1, 2010, pp. 1-39, 3GPP, France.

* cited by examiner

300

TECHNIQUE FOR UPLINK DATA PROCESSING

TECHNICAL FIELD

The present disclosure relates to a technique for processing uplink data pending for transmission. In particular, and without limitation, the disclosure relates to a technique for allocating a granted uplink data volume to pending uplink data on a Data Link layer of a telecommunications device.

BACKGROUND

In cellular telecommunications networks, for example according the Long Term Evolution (LTE) standard, the User Equipment (UE) has to send a Buffer Status Report (BSR) to the Evolved Node B (eNB), to which the UE is connected. The BSR contains information about the amount of pending uplink data, i.e., the data available on the Data Link layer in the UE for transmission. Based on the BSRs received from each of the connected UEs, the eNB has an overview of all pending transmission requests and grants uplink data volumes to the UEs.

The standard document 3GPP TS 36.321 (version 10.5.0, release 10) defines in clause 5.4.5 events that require the Medium Access Control (MAC) sublayer of the Data Link layer to send a BSR. The standard document further defines different sizes for the BSR depending on the number of channels for which uplink data is pending in the UE.

When the UE has received a grant for uplink data transmission and when an event requires the transmission of a BSR, the MAC sublayer has to reserve an amount of bytes corresponding to the size of the BSR, in order to prevent that the reserved bytes are used for user data transmission. The Data Link layer then performs an uplink data processing of the pending uplink data.

As long as the number of channels with pending uplink data does not change during the uplink data processing, the number of bytes actually needed for the BSR does not change and is consistent with the number of reserved bytes. If, however, the number of channels, for which uplink data is pending, is being reduced during the uplink data processing, fewer bytes may actually be needed for the BSR. As a consequence, some of the bytes reserved in the granted uplink data volume are not used for uplink data transmission. It is essential for the performance of the UE to efficiently use all granted uplink resources. In the sketched situation, however, uplink resources may be wasted.

In order to fully use the granted data volume, the reservation could be corrected and the uplink data processing could be repeated based on the corrected reservation. However, such a repetition of grant reserving and uplink data processing delays the transmission of the pending data and additionally requires computational and power resources. Even worse, the size of the BSR can change again as a result of the repeated uplink data processing based on the corrected reservation, which leads to a resource-consuming iteration of the uplink data processing.

An alternative approach could be to increase the size of the last Radio Link Control (RLC) Packet Data Unit (PDU). Such a post-processing can become quite complex, especially in the case of modifying an already generated RLC Status PDU or retransmitting an RLC User PDU. The complex post-processing would not only require additional processing time, but also additional memory resources.

SUMMARY

Accordingly, there is a need for a technique that avoids a waste of transmission resources in connection with transmitting, or refraining from transmitting, a buffer status report.

According to one aspect, a method of allocating in a telecommunications device an uplink data volume to uplink data pending for transmission is provided, wherein the method comprises the steps of receiving a grant of the uplink data volume, reserving a portion of the granted uplink data volume for transmission of a buffer status report of a Data Link layer of the telecommunications device, wherein a size of the buffer status report depends on a number of channels for which uplink data is pending, and if an unreserved portion of the granted uplink data volume is not sufficiently sized for the pending uplink data, allocating the unreserved portion and at least a part of the reserved portion to at least a portion of the pending uplink data when the allocation corresponds to a reduction of the number of channels for which uplink data is pending so that the buffer status report is at least one of reduced in size and avoided.

The reserved portion may be reserved for the size of the buffer status report depending on the number M of channels for which uplink data is pending. The unreserved portion and the part of the reserved portion may be allocated to all the uplink data pending for N channels of the M channels. The N channels may be a subset of the M channels, or $N \leq M$ (e.g., $N < M$). The size of the buffer status report may be reduced or the buffer status report may be avoided as the number of channels for which uplink data is pending is decreased to M-N by the allocation.

The unreserved portion may not be sufficiently sized for the uplink data pending for the N channels. The reserved portion may include an unallocated part, which does not overlap the allocated part and is sufficiently sized for the reduced size of the buffer status report. An increase in the uplink data allocation may be compensated by a decrease in the size of the buffer status report.

At least one of the numbers M and N may be a maximum number. The N channels of the M channels may be at least one of a largest number of channels and a largest collection of uplink data, so that the unallocated part of the reserved portion is sufficiently sized for the reduced size of the buffer status report determined by the reduced number of M-N channels.

The unreserved portion may be allocated to a part of the pending uplink data. The part may be selected so that the unreserved portion is sufficiently sized for that part. The partial allocation may be subject to the condition that there is no number of N channels of the M channels so that the unreserved portion of the granted uplink data volume is not sufficiently sized for the uplink data pending for the N channels and so that the size of the buffer status report reduces to fit into the reserved portion without overlapping the allocated part of the reserved portion.

The method may further comprise the step of allocating the unreserved portion to all of the pending uplink data, if the unreserved portion of the granted uplink data volume is sufficiently sized for all the uplink data pending for the M channels.

Each of the channels may include at least one radio bearer. The allocation of the unreserved portion may be successively performed, for example radio bearer by radio bearer. The allocation may be performed until an unallocated part of the unreserved portion is not sufficiently sized for uplink data pending on a next radio bearer.

The channels may logical channels of the Data Link layer. The radio bearers may be grouped in logical channels.

The Data Link layer may include one or more of a Packet Data Convergence Protocol sublayer, a Radio Link Control sublayer and a Medium Access Control sublayer. The uplink data may be pending on at least one of the Packet Data Convergence Protocol sublayer and the Radio Link Control sublayer. The reservation may be performed by the Medium Access Control sublayer.

At least one of the size of the reserved portion and the size of the unreserved portion are may be determined by the Medium Access Control sublayer. At least one of the size of the reserved portion and the size of the unreserved portion may be signaled to each of the Packet Data Convergence Protocol sublayer and the Radio Link Control sublayer.

The allocation may be performed on the Data Link Layer, for example by at least one of the Packet Data Convergence Protocol sublayer and the Radio Link Control sublayer. The allocation may include scheduling a transmission of the allocated uplink data for an upcoming transmission time interval. The grant may indicate at least one of a size of the uplink data volume and a transmission time interval. The grant may be based on a previously transmitted buffer status report.

The portion may be reserved at a time prior to the allocation. A buffer status report may be included in the unallocated part of the reserved portion after the allocation. The buffer status report may be included in the unallocated part of the reserved portion. The number of M channels including pending uplink data may be determined at a time prior to the allocation. The reduced number of M-N channels may correspond to a number of channels including pending uplink data after the allocation.

The unreserved portion may be defined by the granted uplink data volume less the reserved portion. The reserved portion may be sized according to the size of buffer status report. A size of the unreserved portion may equal a size of the granted uplink data volume subtracted by the reserved portion.

The method may be triggered by a predetermined criterion for uplink transmission of a buffer status report is fulfilled. The criterion may include the occurrence of one of the events specified in clause 5.4.5 of 3GPP TS 36.321, Version 10.5.0, Release 10, or a corresponding clause in a later version thereof.

The sizes assumed by the buffer status report as a function of the number of channels including pending data may be predetermined. The predetermined sizes may, for example, include zero, 2 bytes and 4 bytes. Those predetermined sizes may be assumed for uplink data pending on no channels, one channel, and more than one channel, respectively. The reduction in the number of pending channels may be associated with the reduction in the size of the buffer status report.

According to another aspect, a computer program product is provided. The computer program product comprises code portions for performing one or more of the steps of the method described therein when the computer program product is executed on one or more computer devices. The computer program product may be stored on a computer-readable recording medium such as a permanent or re-writable memory. The computer program product may also be provided for download by a one or more computer networks, such as the Internet, a cellular telecommunications network, or a wireless or wired Local Area Network (LAN).

As for a hardware aspect, an apparatus for allocating in a telecommunications device an uplink data volume to uplink data pending for transmission is provided. The apparatus comprises a receiving unit adapted to receive a grant of the uplink data volume, a reserving unit adapted to reserve a portion of the granted uplink data volume for transmission of a buffer status report of a Data Link layer of the telecommunications device, wherein a size of the buffer status report depends on a number of channels for which uplink data is pending, and an allocating unit adapted to allocate, if an unreserved portion of the granted uplink data volume is not sufficiently sized for the pending uplink data, the unreserved portion and at least a part of the reserved portion to at least a portion of the pending uplink data when the allocation corresponds to a reduction of the number of channels for which uplink data is pending so that the buffer status report is at least one of reduced in size and avoided.

The above-mentioned units or additional units of the apparatus may be further adapted to perform one or more of the steps mentioned in the context of the method aspect. Moreover, the reserved portion may include an unallocated part, which does not overlap the allocated part and is sufficiently sized for the reduced size of the buffer status report.

BRIEF DESCRIPTION OF THE DRAWINGS

In what follows, further details and advantages of the disclosure are described with reference to exemplary embodiments illustrated in the drawings, wherein FIG. 1 schematically illustrates an embodiment of a telecommunications network environment including an actively connected mobile device comprising an apparatus for allocating an uplink data volume to uplink data pending for transmission.

DETAILED DESCRIPTION

In the following, for purposes of explanation and not limitation, specific details are set forth, such as particular sequences of steps, components and configurations, in order to provide a thorough understanding the present disclosure. It will be apparent to a person skilled in the art that the disclosure may be practiced in other embodiments that depart from these specific details. For example, while the embodiments are described with reference to a mobile telecommunications network, base stations and mobile devices working according to the 3GPP LTE specifications, it will be apparent to the skilled person that the disclosure can also be practiced in the context of mobile telecommunications networks and components which are working in accordance with other mobile communication standards such as the Universal Mobile Telecommunications System (UMTS). Furthermore, while the disclosure is primarily described in the context of a Data Link layer, the disclosure may, partially or completely, be implemented on another layer of a transmission protocol (e.g., on a physical layer or a transport layer) or on a layer of a Radio Resource Control (RRC) protocol (e.g., on a control plane or data plane).

Moreover, those skilled in the art will appreciate that services, functions, logic components, and steps explained herein may be implemented using software functioning in conjunction with a programmed microprocessor, or using an Application Specific Integrated Circuit (ASIC), a Digital Signal Processor (DSP) or a general purpose computer. It will also be appreciated that, while the following embodiments are described in the context of methods and devices, the technique presented herein may also be embodied in a computer program product as well as in a system comprising a computer processor and a memory coupled through the processor, wherein the memory is encoded with one or more programs to execute the services, functions, logical components, and steps disclosed herein.

Figure 1:
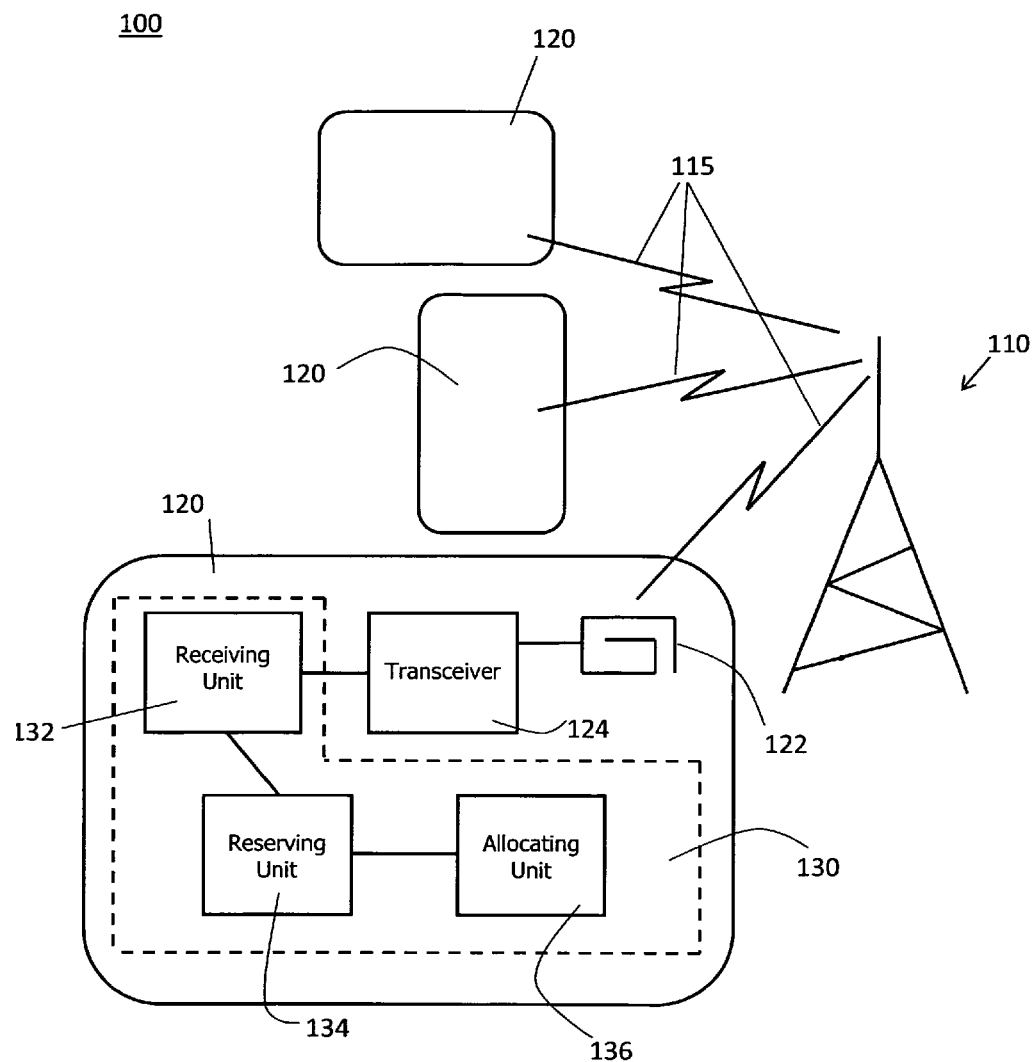

FIG. 1 shows an exemplary network environment for practicing the technique disclosed herein. As illustrated in FIG. 1, wireless telecommunications network 100 includes a base station 110 and a plurality of mobile devices 120 in wireless communications via active connections 115 with the base station 110.

At least some of the actively connected mobile devices 120 are configured to send a buffer status report to the base station 110. The buffer status report may comply with clause 5.4.5 of 3GPP TS 36.321 (Version 10.5.0, Release 10) or a similar standard. The base station 110 is thus provided with information about the amount of data available for transmission in an uplink buffer of the mobile device 120. Based on the buffer status reports received from the plurality of mobile devices 120, the base station 110 schedules the mobile devices 120 for uplink data transmission. Every millisecond, the base station 110 assigns the available uplink resources to one or, more often, several mobile devices 120. Since a transmission capacity of the wireless connections 115 is limited in bandwidth, it is crucial to efficiently share resources among the mobile devices 120.

From a point of view of each of the mobile devices 120, it is advantageous to efficiently use all granted uplink resources, i.e., to use all bytes of a granted uplink data volume for transmission. 3GPP TS 36.321 stipulates a size of the buffer status report, including the case that no buffer status report is to be sent, depending on a number of logical channels (abbreviated by LCH), for which uplink data is pending in the mobile device 120.

Again referring to FIG. 1, the mobile device 120 includes at least one antenna 122 coupled to a transceiver 124 that implements a physical layer of the connection 115. The mobile device 120 further includes an apparatus 130 implementing a Data Link layer of the transmission protocol. The apparatus 130 comprises a receiving unit 132 for receiving a grant of an uplink data volume from the base station 110, a reserving unit 134 for reserving a portion of the granted uplink data volume for a buffer status report, and an allocating unit 136 for allocating the unreserved portion, and when applicable, at least a part of the reserved portion to pending uplink data.

Figure 2:
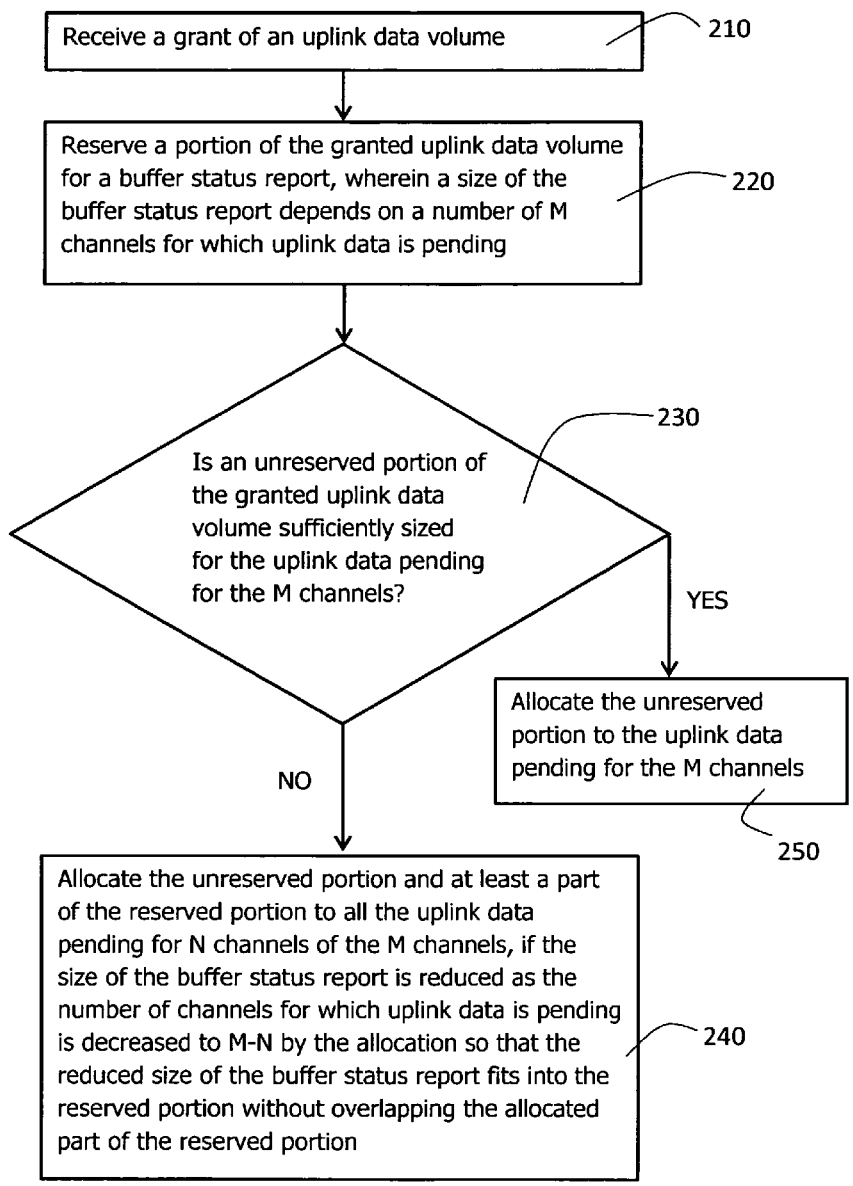
FIG. 2 shows a flow chart of an embodiment of a method of allocating in the mobile device of FIG. 1 an uplink data volume to uplink data pending for transmission.

FIG. 2 shows a general embodiment of a method 200 of allocating in a telecommunications device an uplink data volume to uplink data pending for transmission. The method comprises a step 210 of receiving a grant of an uplink data volume, and a step 220 of reserving a portion of the granted data volume for a buffer status report. A size of the buffer status report depends on a number of M logical channels, on which uplink data is pending. In a decision step 230, it is determined whether an unreserved portion of the granted uplink data volume is sufficiently sized for the uplink data pending on the M channels.

In case the unreserved portion is not sufficiently sized, the unreserved portion and at least a part of the reserved portion is allocated in a step 240 to uplink data pending on N channels out of the M channels. The allocation is subject to the condition that the allocation corresponds to a reduction of the number of channels, on which uplink data in pending, so that the buffer status report is reduced in size or avoided. The reduced size is determined by a number of M–N remaining channels for N<M. The buffer status report is avoided for N=M.

Otherwise, the unreserved portion is allocated to all pending uplink data according to step 250.

The telecommunications device may be the base station 110 or any one of the mobile devices 120. In case the mobile device 120 takes the role of the telecommunications device, the step 210 is implemented by the receiving unit 132, the step 220 is implemented by the reserving unit 134, and the steps 230 to 250 are implemented by the allocating unit 136. In this case, the grant is received from the base station 110.

Figure 3:
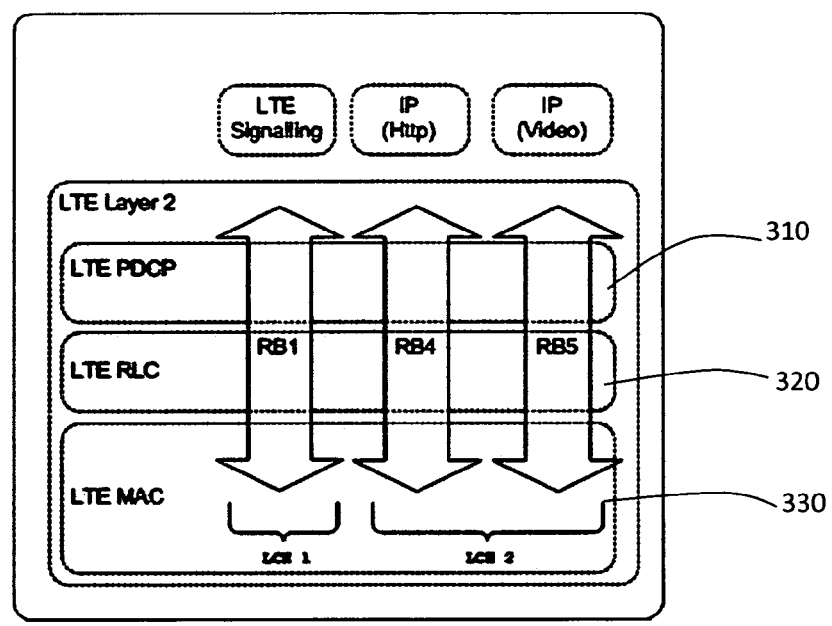
FIG. 3 schematically illustrates a logical structure of the apparatus shown in FIG. 1.

FIG. 3 shows the Data Link layer 300 implemented in the apparatus 130 of the mobile device 120. The Data Link layer 300 includes a Packet Data Convergence Protocol sublayer 310, a Radio Link Control sublayer 320 and a Medium Access Control sublayer 330. In the ("vertical") direction of data exchange, the Data Link layer 300 is structured by a control plane and a user plane. The LTE signaling is exchanged in the control plane using a logical channel LCH1. User data provided by higher layers, such as Internet Protocol (IP) packets, is exchanged on the user plane using a logical channel LCH2. All uplink data transmission is routed via Radio Bearers (RBs). Each radio bearer is mapped by the base station 110 to one of four uplink logical channels (LCH1 to LCH4).

LTE specifies two kind of buffer status reports (BSRs), as defined on page 27 of the above mentioned 3GPP TS 36.321. A "short BSR" is reported when the pending uplink data is available for only one logical channel, whereas a "long BSR" is reported when more than one logical channel includes pending uplink data. LTE further stipulates not to send a buffer status report when it is possible to transmit all pending uplink data (cf. page 27 of the above-mentioned LTE standard document).

The MAC sublayer has to reserve either 2 or 4 bytes of the granted uplink data volume for the transmission of the short BSR or the long BSR, respectively. In this context "pending data" relates to data available for the uplink transmission on the PDCP sublayer 310 or the RLC sublayer 320. Uplink data pending on the PDCP sublayer 310 includes new data that has not previously been transmitted. Data pending on the RLC sublayer 320 may include Packet Data Units (PDUs) to be retransmitted in response to receiving a negative RLC Status PDU from a peer RLC entity and RLC Status PDUs indicating negative or positive reception of previously transmitted PDUs.

Figure 4:
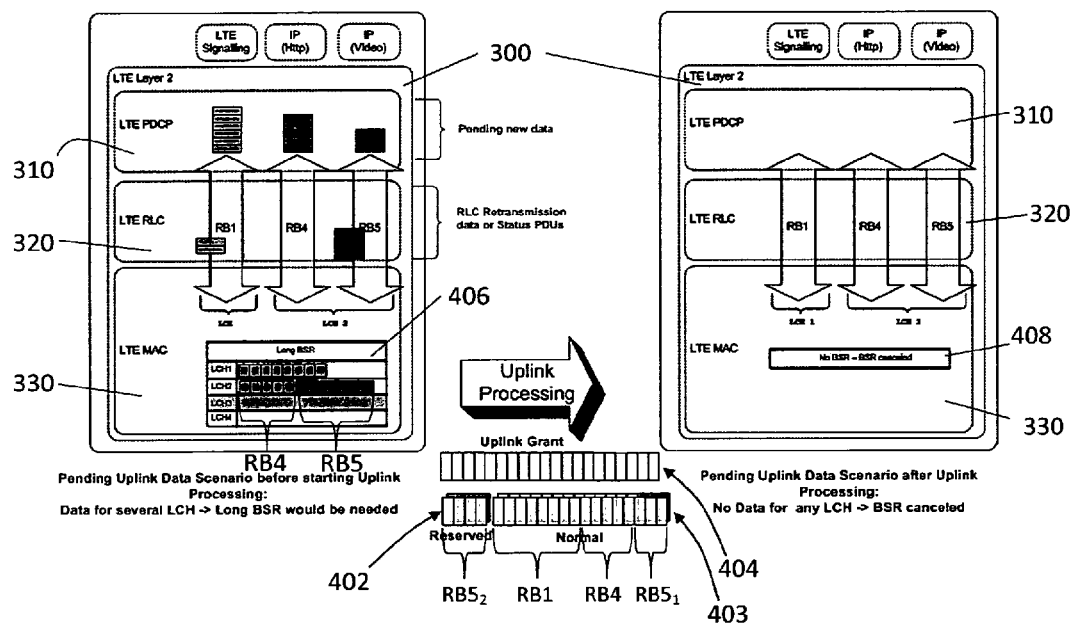
FIG. 4 illustrates an allocation avoiding a long buffer status report.
Figure 5:
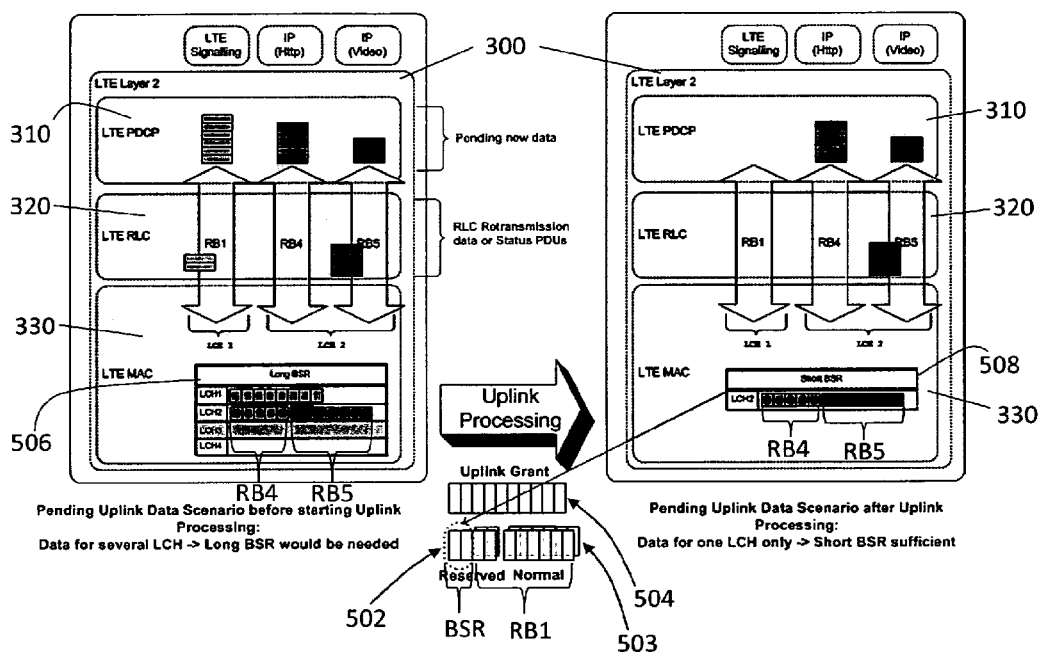
FIG. 5 illustrates an allocation reducing a long buffer status report to a short buffer status report.
Figure 6:
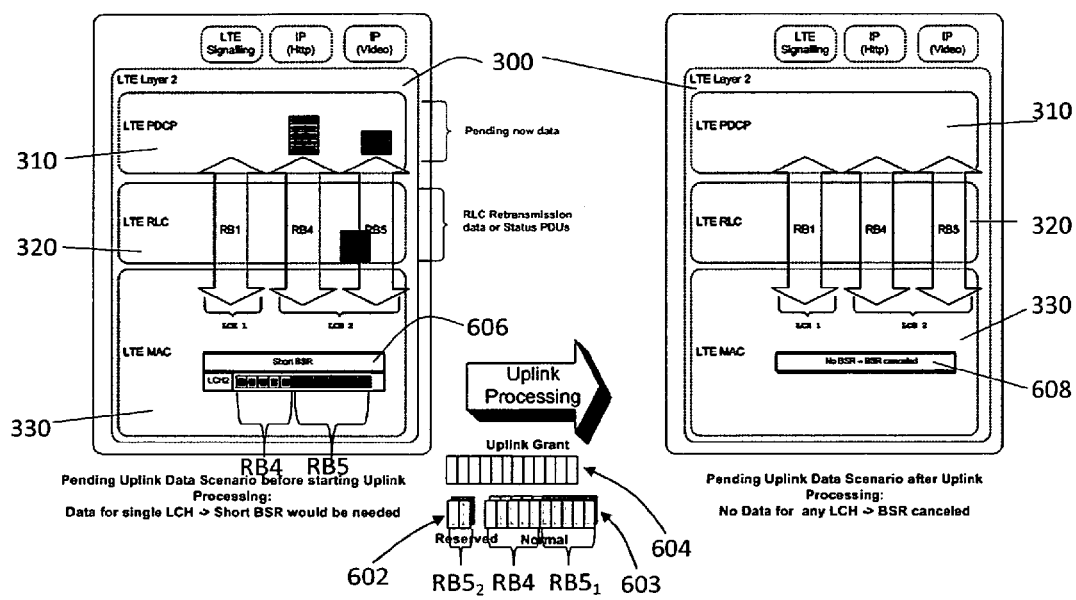
FIG. 6 illustrates an allocation avoiding a short buffer status report.

Each of the FIGS. 4 to 6 schematically illustrates pending uplink data and a corresponding buffer status report of the Data Link layer 300 before uplink data processing (situation shown on the left-hand side) and after the uplink processing (situation on the right-hand side). The uplink data processing includes the allocation according to the steps 230 to 250 of the method 200.

FIG. 4 shows a first example of entirely allocating a reserved portion 402 of the granted uplink volume 404 to pending uplink data. The allocation is consistent with the avoidance of the buffer status report.

Prior to the uplink data processing, the radio bearer RB1, which is mapped to the logical channel LCH1, includes in total 8 bytes of pending uplink data. The radio bearers RB4 and RB5 are mapped to the logical channel LCH2. The radio bearer RB4 has 5 bytes of pending uplink data, and the radio bearer RB5 has in total 7 bytes of pending uplink data. Consequently, uplink data is pending for two logical channels and the MAC sublayer 330 reserves the portion 402 having a size of 4 bytes of the granted uplink data volume 404 for a long BSR 406.

Instead of allocating an unreserved portion 403 to only a portion of the uplink data pending for the two logical channels LCH1 and LCH2, by allocating all of the pending uplink data no buffer status report 408 is required. Since the uplink data volume 404 is sufficiently sized for all of the pending uplink data, and since depleting the buffers of all logical channels leads to the avoidance of the buffer status report 408, the reduction in the size of the buffer status report from 4 bytes to 0 bytes matches with the increase in allocating also the reserved portion to the pending uplink data.

FIG. 5 shows a second example of using half of a reserved portion 502 of a granted uplink data volume 504. The allocation is consistent with an uplink data processing that avoids the long BSR 506 in favor of a short BSR 508, i.e., a reduction in BSR size.

Initially, the logical channel LCH1 comprises 8 bytes of pending uplink data and the granted uplink data volume 504 comprises 10 bytes. The amount of data pending for the LCH1 is consistent with allocating 6 bytes of the 8 bytes of an unreserved portion 503 and 2 bytes of the 4 bytes of the reserved portion 502 (reserved for the long BSR 506) to the uplink data pending on the radio bearer RB1 of the logical channel LCH1, so that only the logical channel LCH2 remains with pending uplink data. Consequently, the short BSR 508 having a size of 2 bytes has to be transmitted and fits into the unallocated part of the reserved portion 502 of the granted uplink data volume 504. The second example is thus an example for reducing the BSR size from 4 bytes to 2 bytes.

FIG. 6 shows a third example of entirely allocating a reserved portion 602, which is initially reserved on the granted uplink data volume 604 for a short BSR 606, to pending uplink data. The allocation is consistent with the avoidance of the buffer status report 608.

Before the uplink data processing, uplink data is only pending for the logical channel LCH2. Consequently, the MAC layer 330 reserves a portion 602 of the granted uplink data volume 604 for the short BSR 606. In the course of processing the uplink data pending on the radio bearers RB4 and RB5 mapped to the logical channel LCH2, an unreserved portion 603 and the reserved portion 602 are allocated to the pending uplink data, because this leads to a depletion of the logical channel LCH2 and, thus, to the avoidance 608 of the short BSR 606.

Considering the avoidance of the buffer status report as the case of zero BSR size, there are n'=3 different BSR sizes in LTE. More general, for a transmission protocol defining n' different sizes as a function of the number of pending logical channels (e.g., the three states of 0, 1, and more than 1 logical channels including pending uplink data), there are "n' over 2"=n'(n'−1)/2 possible transitions (namely, 2 unequal initial and final states out of the n' possible states). Considering only the number n=n'−1 of non-zero BSR sizes (i.e., without counting the BSR avoidance), there are (n+1) n/2 cases of BSR reduction or avoidance. This corresponds for the LTE case of n=n'−1=2 different BSR sizes (i.e., short BSR and long BSR) to the afore-mentioned (n+1)n/2=3 examples of FIGS. 4 to 6. The skilled person will appreciate that the technique disclosed herein can also be applied to transmission protocols defining more or less than n=2 different sizes of the buffer status report.

Figure 7:
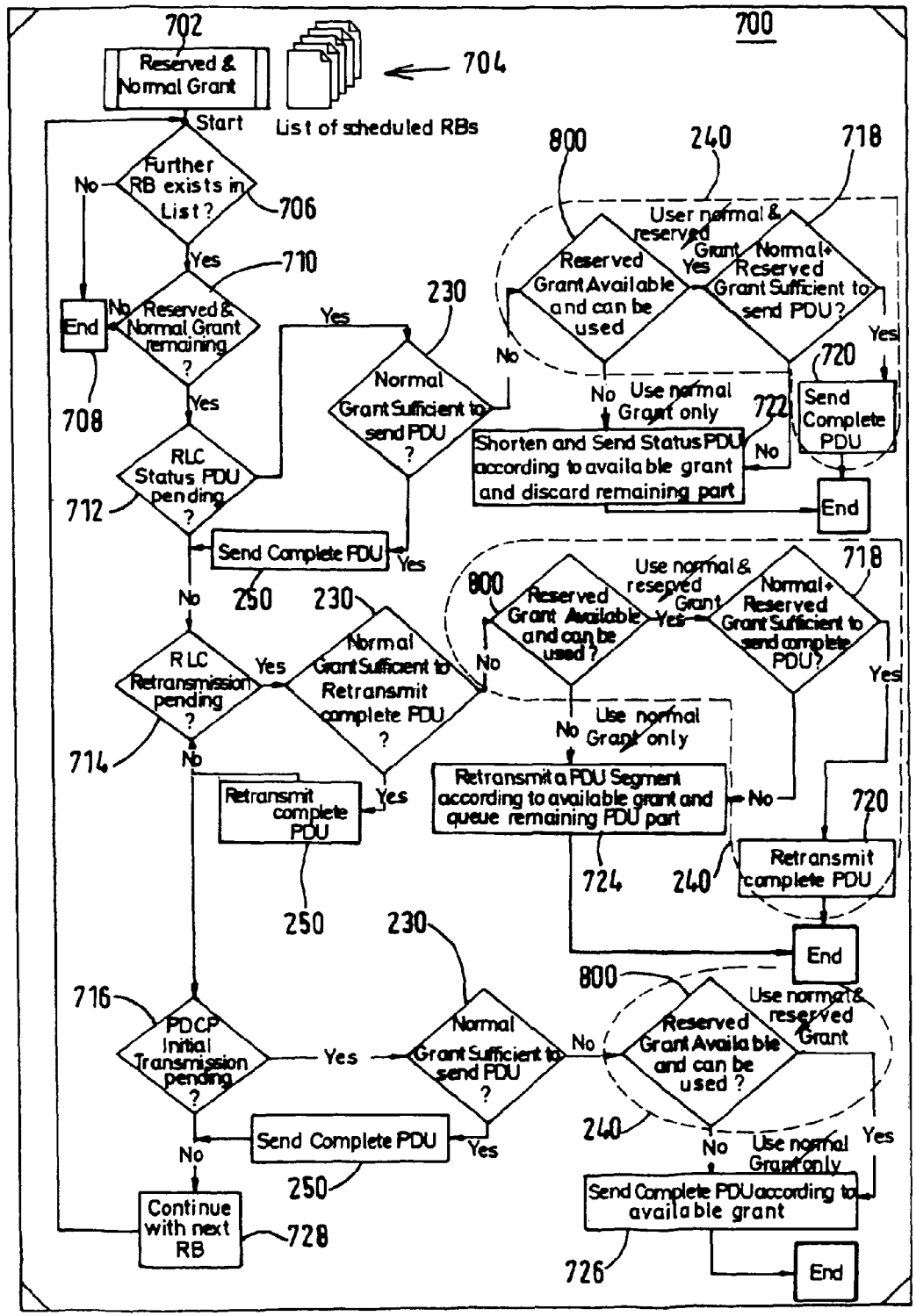
FIG. 7 shows a flow chart for performing the method of FIG. 2 for a plurality of radio bearers.
Figure 8:
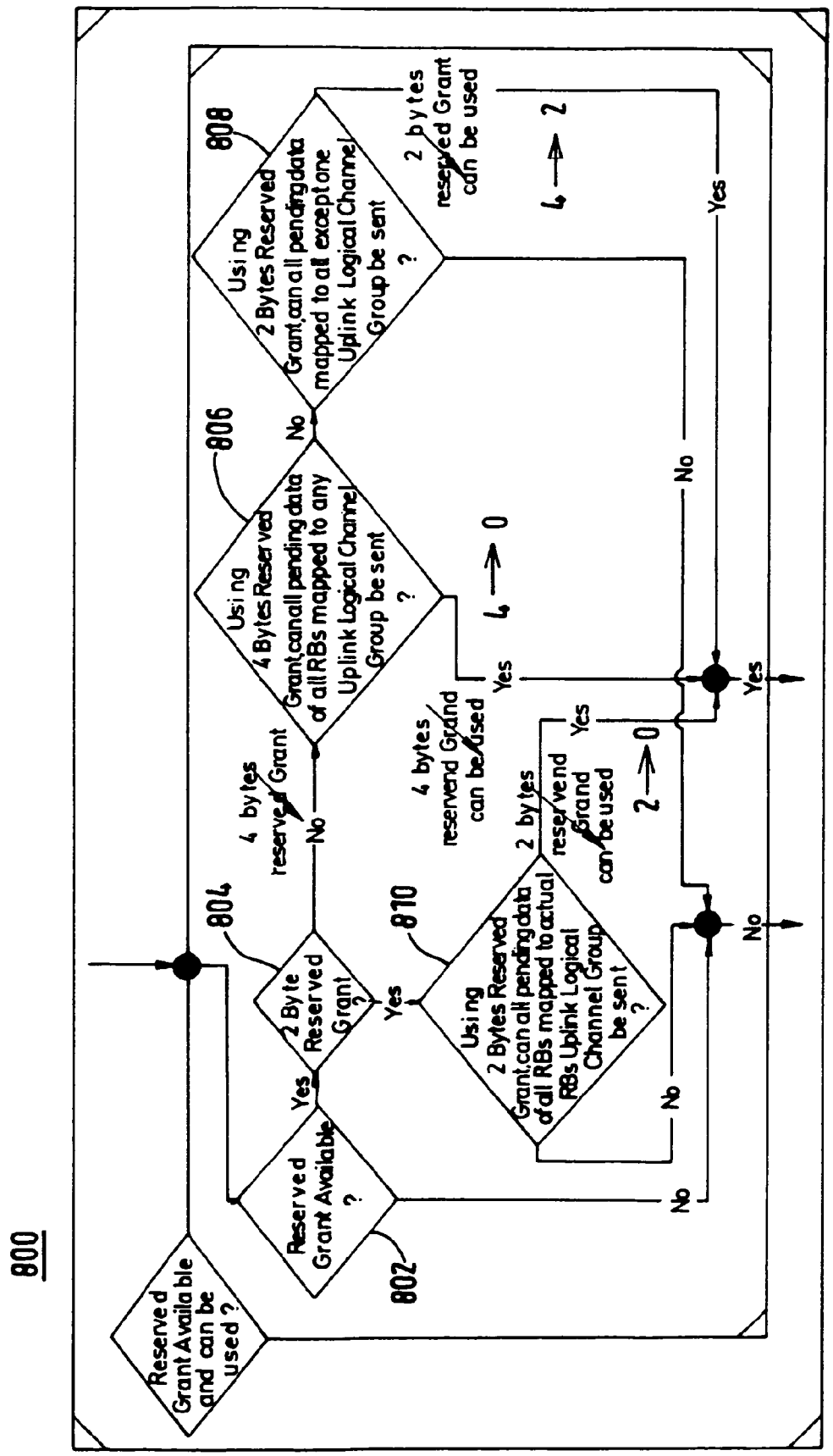
FIG. 8 shows a flow chart including details of an allocation decision in FIG. 7.

The uplink data processing is described in more details with reference to the FIGS. 7 and 8. The technique can be referred to as a "reserved grant handling technique", because the MAC layer 330 reserves 2 or 4 bytes of the granted uplink data volume 404, 504 or 604 when the short BSR or the long BSR, respectively, is triggered. The MAC sublayer 330 subtracts the size of the reserved portion 402, 502 or 602 from the granted uplink data volume 404, 504 or 604 resulting in the size of the unreserved portion 403, 503 or 603. The MAC sublayer 330 signals the size of the reserved portion 402, 502 or 602 and the size of the unreserved portion 403, 503 or 603 to the PDCP sublayer 310 and the RLC sublayer 320.

As long as the unreserved portion is available for allocation, the PDCP sublayers 310 and the RLC sublayer 320 schedule their pending uplink data as usual. Only if the unreserved portion 403, 503 or 603, to the extent not yet allocated, is not sufficiently sized for transmitting all uplink data pending on one of their logical channels, it is assessed whether allocating some or all of the reserved portion 402, 502 or 602 to all the data pending for one or more their logical channels is possible and would lead to a reduction or an avoidance of the buffer status report. In this case, the initially reserved portion 402, 502 or 602 can be used by the PDCP sublayer 310 and/or the RLC sublayer 320 for transmitting the pending uplink data, if the number of logical channels could be reduced to zero (in which case the entire granted data volume can be used) or to one (in which case two of the initially four reserved bytes can be used) during the uplink data processing.

FIG. 7 shows a flow chart 700 of the uplink data processing performed by the PDCP sublayer 310 and the RLC sublayer 320. The uplink data processing is based on the reserved portion 402, 502 or 602 and the unreserved portion 403, 503 or 603 (which are collectively denoted by reference sign 702) as well as a list of radio bearers 704, for which uplink data is pending. The information 702 and 704 is provided by the MAC sublayer 330 to PDCP sublayer 310 and the RLC sublayer 320.

The uplink data processing is performed, radio bearer by radio bearer, starting at a step 706 of assessing whether further radio bearers exists in the list 704. If no further radio bearers exist in the list 704, the uplink data processing ends, which end is indicated by reference sign 708. Since the unreserved portion and, potentially, the reserved portion are successively allocated in the uplink data processing, a step 710 verifies that at least one of the reserved portion and the unreserved portion is at least partially available, i.e. has not yet been allocated.

Within the uplink data processing for each radio bearer in the list 704, the method processes with higher priority the uplink data pending on the RLC sublayer 320 in the steps 712 and 714, and processes with lower priority the uplink data pending on the PDCP sublayer 310 in a step 716.

The uplink data processing on the sublayers 310 and 320 is similar and denoted by like reference signs in the flow chart 700. For avoiding a repetitive description, the uplink data processing is exemplified for the case of a pending RLC Status PDU.

In the step 230, the RLC sublayer 320 assesses whether the unreserved portion 402, 502 or 602 is sufficiently sized for transmitting the PDU, which step corresponds to the step 230 as described with reference to FIG. 2 for M=1. In case the unreserved portion 402, 502 or 602 is sufficiently sized, the complete PDU is allocated and transmitted according to the step 250.

Otherwise, the allocation according to the step 240 is performed when the allocation corresponds to a reduction of the number of channels for which uplink data is pending so that the buffer status report is at least one of reduced in size and avoided. Latter condition is assessed in a step 800 described in more details with reference to FIG. 8 below. A step 718 verifies that the available unreserved portion 403, 503 or 603 and the at least partially available reserved portion 402, 502 or 602 are sufficiently sized for transmitting the PDU: If the available unreserved portion and the at least partially available reserve portion are sufficiently size, the complete PDU is allocated for transmission in a step 720.

In case the reserved portion 402, 502 or 602 is not available or the available unreserved portion 403, 503 or 603 in conjunction with the at least partially available reserved portion 402, 502 or 602 is not sufficiently sized, the PDU pending for transmission is shortened to the available transmission capacity and the remaining part is discarded in a step 722.

Similarly, the uplink data of an RLC Retransmission PDU (starting at branching step 714) and of a PDCP Initial Transmission (starting at branching step 716) are processed. In the case of processing of the RLC Retransmission PDU by branching of in the step 714, a partial transmission step 724 similar to the step 722 is performed with the difference of retransmitting a PDU segment.

In the case of uplink data pending on the PDCP sublayer 310, the complete PDU is transmitted in a step 726, wherein the PDU is, by construction, sized according to the available uplink data volume. Whenever step 230 evaluates to "NO", it is already decided that the procedure will end after processing (e.g., allocating and scheduling) the last PDU in the step 726. The intermediary branching step 800 does not influence the flow but determines the uplink data volume available for the last PDU in the step 726. More specifically, the step 800 determines if reserved grant, and if so, how much of the reserved grant can be used. The available uplink data volume is then allocated in the step 726. Since the reserved portion is used, the size of the transmitted PDU is not predetermined but depends on the determination in the step 800.

If the processing of the current radio bearer does not (completely) use the reserved grant (i.e., in case of a flow entering the "NO"-branch after step 716 or in case of a flow along the steps 716, 230, 250), the uplink data processing is continued for the next radio bearer in step 728.

The step 800 of assessing the availability of at least a part of the reserved portion verifies in a step 802 that the preserved portion 402, 502 or 602 is still available, i.e., has not yet been completely allocated to another radio bearer. A step 804 differentiates between a short BSR (i.e., two reserved bytes) and a long BSR (i.e., four reserved bytes).

The fulfillment of the matching condition is then assessed for the first possible transition from the long BSR to the avoidance of the BSR in a step 806. In other words, it is assessed whether the number of logical channels, for which uplink data is pending, can be reduced to zero by using all four bytes of the reserved portion 402, which corresponds to the case described with reference to FIG. 4.

If the avoidance of the long BSR is not possible, a step 808 assesses whether the matching condition can be fulfilled by additionally using the two bytes of the reserved portion 502. In other words, it is assessed whether the unreserved portion 503 and at least two bytes of the reserved portion 502 can be allocated to the uplink data pending on all except one logical channel, which corresponds to the case N=M−1 of the step 240 and to the second example described with reference to FIG. 5.

In the case of a short BSR, a step 810 assesses the matching condition. More specifically, it is assessed whether the unreserved portion 603 and the two bytes of the reserved portion 602 are sufficiently sized to be allocated to all pending uplink data so that all logical channels are completed and the short BSR is avoided, which corresponds to the case described with reference to FIG. 6.

As has become apparent from the exemplary embodiments, at least some of the embodiments allow a MAC layer to comply with the required transmission of a buffer status report so that all of the granted uplink data volume is efficiently used without the need of any post-activity or the maintenance of additional processing information, which would be needed if after uplink data processing less than the reserved portion is needed for the buffer status report. At least some of the embodiments thus require less time for the uplink data processing, or consume less memory.

Certain embodiments allow to efficiently use the available granted uplink data volume, especially in scenarios when after the uplink data processing a smaller buffer status report, or even no buffer status report, needs to be transmitted by the telecommunications device when using the additional bytes available for transmitting pending uplink data.

At least in some embodiments, an efficient interaction of the sublayers within the Data Link layer is realized by distributing the decision about allocating the uplink data volume over all sublayers.

As will be recognized by those skilled in the art, the features described herein can be modified and varied over a wide range of applications. Accordingly, the scope of patented subject-matter should not be limited to any of the specific exemplary teachings discussed above but is defined by the following claims.

The invention claimed is:

1. A method, in a telecommunications device, of allocating an uplink data volume to uplink data pending for transmission, the method comprising:
  receiving a grant of the uplink data volume;
  reserving a portion of the granted uplink data volume for transmission of a buffer status report of a Data Link layer of the telecommunications device, wherein a size of the buffer status report depends on a number of channels for which uplink data is pending;
  if an unreserved portion of the granted uplink data volume is sufficiently sized for the pending uplink data, allocating the unreserved portion to the pending uplink data;
  if the unreserved portion of the granted uplink data volume is not sufficiently sized for the pending uplink data, allocating the unreserved portion and at least a part of the reserved portion to at least a portion of the pending uplink data when the allocation corresponds to a reduction of the number of channels for which uplink data is pending so that the buffer status report is at least one of reduced in size and avoided;

wherein the reserved portion is reserved for the size of the buffer status report depending on a number M of channels for which uplink data is pending;

wherein the unreserved portion and the part of the reserved portion are allocated to all the uplink data pending for N channels of the M channels, wherein N≤M;

wherein the size of the buffer status report is reduced or the buffer status report is avoided as the number of channels for which uplink data is pending is decreased to M−N by the allocation.

2. The method of claim 1, wherein the unreserved portion is not sufficiently sized for the uplink data pending for the N channels.

3. The method of claim 1, wherein the reserved portion includes an unallocated part which does not overlap the allocated part and is sufficiently sized for the reduced size of the buffer status report.

4. The method of claim 3, wherein the N channels of the M channels are at least one of a largest number of channels and a largest collection of uplink data, so that the unallocated part of the reserved portion is sufficiently sized for the reduced size of the buffer status report determined by the reduced number of M−N channels.

5. The method of claim 1, wherein the unreserved portion is allocated to a part of the pending uplink data, the part being selected so that the unreserved portion is sufficiently sized for the part, if there is no number of N channels of the M channels so that the unreserved portion of the granted uplink data volume is not sufficiently sized for the uplink data pending for the N channels and so that the size of the buffer status report reduces to fit into the reserved portion with-out overlapping the allocated part of the reserved portion.

6. The method of claim 1, further comprising, if the unreserved portion of the granted uplink data volume is sufficiently sized for all the uplink data pending for the M channels, allocating the unreserved portion to all of the pending uplink data.

7. The method of claim 1, wherein the channels are logical channels of the Data Link layer.

8. The method of claim 1, wherein the allocation includes scheduling a transmission of the allocated uplink data for an upcoming transmission time interval.

9. The method of claim 1, wherein the method is triggered when a predetermined criterion for uplink transmission of a buffer status report is fulfilled.

10. A method, in a telecommunications device, of allocating an uplink data volume to uplink data pending for transmission, the method comprising:
receiving a grant of the uplink data volume;
reserving a portion of the granted uplink data volume for transmission of a buffer status report of a Data Link layer of the telecommunications device, wherein a size of the buffer status report depends on a number of channels for which uplink data is pending;
if an unreserved portion of the granted uplink data volume is sufficiently sized for the pending uplink data, allocating the unreserved portion to the pending uplink data;
if the unreserved portion of the granted uplink data volume is not sufficiently sized for the pending uplink data, allocating the unreserved portion and at least a part of the reserved portion to at least a portion of the pending uplink data when the allocation corresponds to a reduction of the number of channels for which uplink data is pending so that the buffer status report is at least one of reduced in size and avoided;
wherein each of the channels includes at least one radio bearer;
wherein the allocation of the unreserved portion is successively performed radio bearer by radio bearer until an unallocated part of the unreserved portion is not sufficiently sized for uplink data pending on a next radio bearer.

11. A method, in a telecommunications device, of allocating an uplink data volume to uplink data pending for transmission, the method comprising:
receiving a grant of the uplink data volume;
reserving a portion of the granted uplink data volume for transmission of a buffer status report of a Data Link layer of the telecommunications device, wherein a size of the buffer status report depends on a number of channels for which uplink data is pending;
if an unreserved portion of the granted uplink data volume is sufficiently sized for the pending uplink data, allocating the unreserved portion to the pending uplink data;
if the unreserved portion of the granted uplink data volume is not sufficiently sized for the pending uplink data, allocating the unreserved portion and at least a part of the reserved portion to at least a portion of the pending uplink data when the allocation corresponds to a reduction of the number of channels for which uplink data is pending so that the buffer status report is at least one of reduced in size and avoided;
wherein the Data Link layer includes a Packet Data Convergence Protocol sublayer, a Radio Link Control sublayer, and a Medium Access Control sublayer;
wherein the uplink data is pending on at least one of the Packet Data Convergence Protocol sublayer and the Radio Link Control sublayer;
wherein the reservation is performed by the Medium Access Control sublayer.

12. The method of claim 11, wherein the size of the reserved portion and the size of the unreserved portion are determined by the Medium Access Control sublayer and signaled to each of the Packet Data Convergence Protocol sublayer and the Radio Link Control sublayer.

13. The method of claim 11, wherein the allocation is performed by at least one of the Packet Data Convergence Protocol sublayer and the Radio Link Control sublayer.

14. A method, in a telecommunications device, of allocating an uplink data volume to uplink data pending for transmission, the method comprising:
receiving a grant of the uplink data volume;
reserving a portion of the granted uplink data volume for transmission of a buffer status report of a Data Link layer of the telecommunications device, wherein a size of the buffer status report depends on a number of channels for which uplink data is pending;
if an unreserved portion of the granted uplink data volume is sufficiently sized for the pending uplink data, allocating the unreserved portion to the pending uplink data;
if the unreserved portion of the granted uplink data volume is not sufficiently sized for the pending uplink data, allocating the unreserved portion and at least a part of the reserved portion to at least a portion of the pending uplink data when the allocation corresponds to a reduction of the number of channels for which uplink data is pending so that the buffer status report is at least one of reduced in size and avoided;

wherein the portion is reserved at a time prior to the allocation and the buffer status report is included in the unallocated part of the reserved portion after the allocation.

15. A method, in a telecommunications device, of allocating an uplink data volume to uplink data pending for transmission, the method comprising:
 receiving a grant of the uplink data volume;
 reserving a portion of the granted uplink data volume for transmission of a buffer status report of a Data Link layer of the telecommunications device, wherein a size of the buffer status report depends on a number of channels for which uplink data is pending;
 if an unreserved portion of the granted uplink data volume is sufficiently sized for the pending uplink data, allocating the unreserved portion to the pending uplink data;
 if the unreserved portion of the granted uplink data volume is not sufficiently sized for the pending uplink data, allocating the unreserved portion and at least a part of the reserved portion to at least a portion of the pending uplink data when the allocation corresponds to a reduction of the number of channels for which uplink data is pending so that the buffer status report is at least one of reduced in size and avoided;
 wherein the unreserved portion is defined by the granted uplink data volume less the reserved portion.

16. A computer program product stored in a non-transitory computer readable medium for allocating an uplink data volume to uplink data pending for transmission, the computer program product comprising software instructions which, when run on one or more processing circuits of a telecommunications device, causes the telecommunications device to:
 receive a grant of the uplink data volume;
 reserve a portion of the granted uplink data volume for transmission of a buffer status report of a Data Link layer of the telecommunications device, wherein a size of the buffer status report depends on a number of channels for which uplink data is pending;
 if an unreserved portion of the granted uplink data volume is sufficiently sized for the pending uplink data, allocate the unreserved portion to the pending uplink data;
 if the unreserved portion of the granted uplink data volume is not sufficiently sized for the pending uplink data, allocate the unreserved portion and at least a part of the reserved portion to at least a portion of the pending uplink data when the allocation corresponds to a reduction of the number of channels for which uplink data is pending so that the buffer status report is at least one of reduced in size and avoided;
 wherein the reserved portion is reserved for the size of the buffer status report depending on a number M of channels for which uplink data is pending;
 wherein the unreserved portion and the part of the reserved portion are allocated to all the uplink data pending for N channels of the M channels, wherein $N \leq M$;
 wherein the size of the buffer status report is reduced or the buffer status report is avoided as the number of channels for which uplink data is pending is decreased to M−N by the allocation.

17. An apparatus for allocating, in a telecommunications device, an uplink data volume to uplink data pending for transmission, the apparatus comprising:
 one or processing circuits configured to function as:
  a receiving circuit configured to receive a grant of the uplink data volume;
  a reserving circuit configured to reserve a portion of the granted uplink data volume for transmission of a buffer status report of a Data Link layer of the telecommunications device, wherein a size of the buffer status report depends on a number of channels for which uplink data is pending;
  an allocating circuit configured to:
   allocate, if an unreserved portion of the granted uplink data volume is sufficiently sized for the pending uplink data, the unreserved portion to the pending uplink data;
   allocate, if an unreserved portion of the granted uplink data volume is not sufficiently sized for the pending uplink data, the unreserved portion and at least a part of the reserved portion to at least a portion of the pending uplink data when the allocation corresponds to a reduction of the number of channels for which uplink data is pending so that the buffer status report is at least one of reduced in size and avoided;
 wherein the reserved portion is reserved for the size of the buffer status report depending on a number M of channels for which uplink data is pending;
 wherein the unreserved portion and the part of the reserved portion are allocated to all the uplink data pending for N channels of the M channels, wherein $N \leq M$;
 wherein the size of the buffer status report is reduced or the buffer status report is avoided as the number of channels for which uplink data is pending is decreased to M−N by the allocation.

18. The apparatus of claim 17, wherein the reserved portion includes an unallocated part, which does not overlap the allocated part and is sufficiently sized for the reduced size of the buffer status report.

* * * * *